Sept. 14, 1965 L. JACHIMOWICZ 3,206,541
SHEATHED ELECTRICAL CABLE
Filed April 29, 1963 2 Sheets-Sheet 1
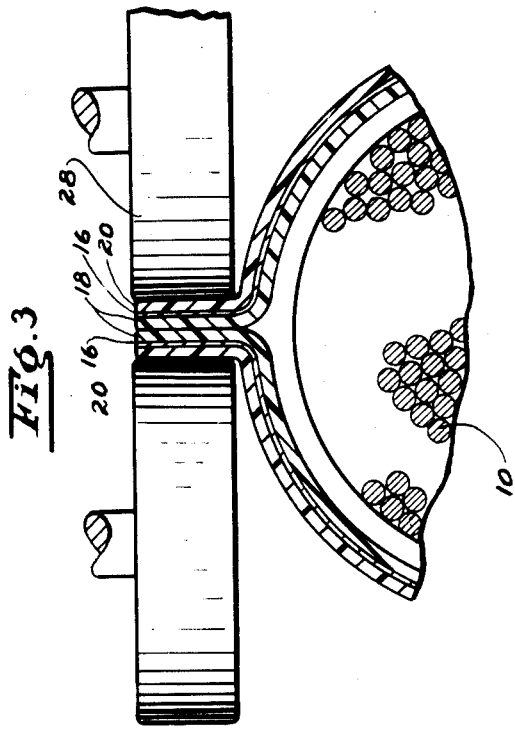
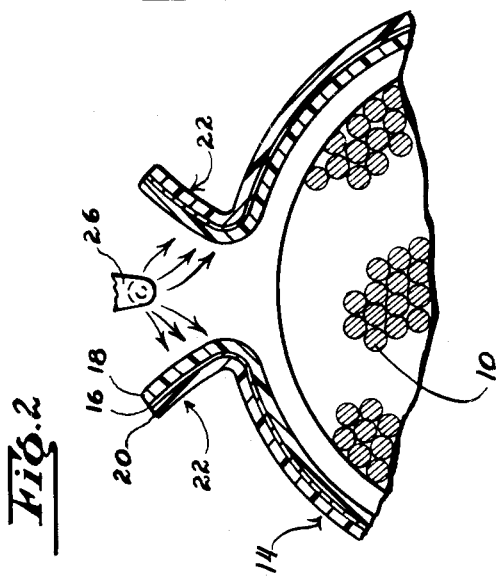
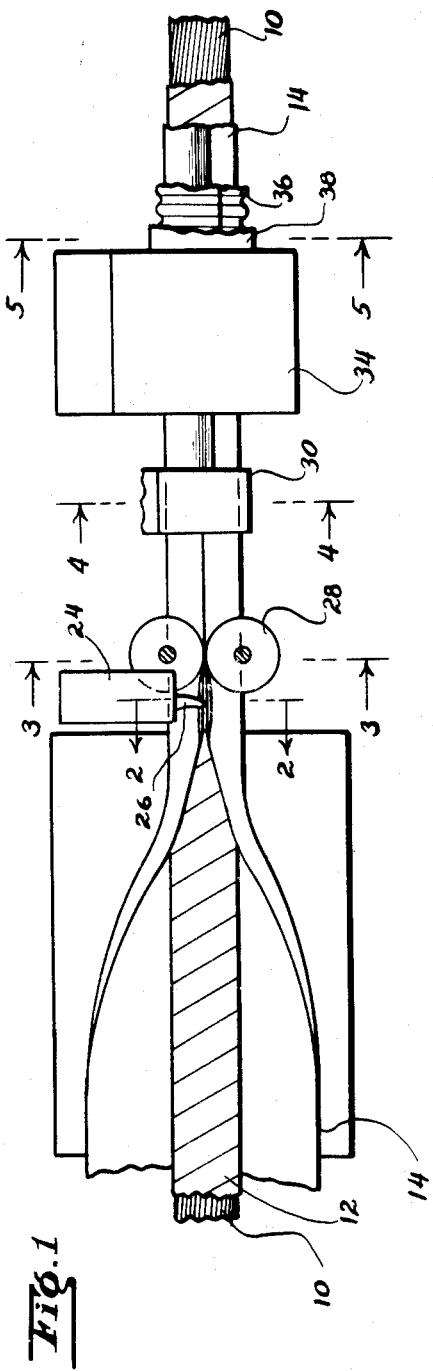
INVENTOR.
LUDWIK JACHIMOWICZ
BY
Emery Whitmore Sandoe Hudson
ATTORNEYS

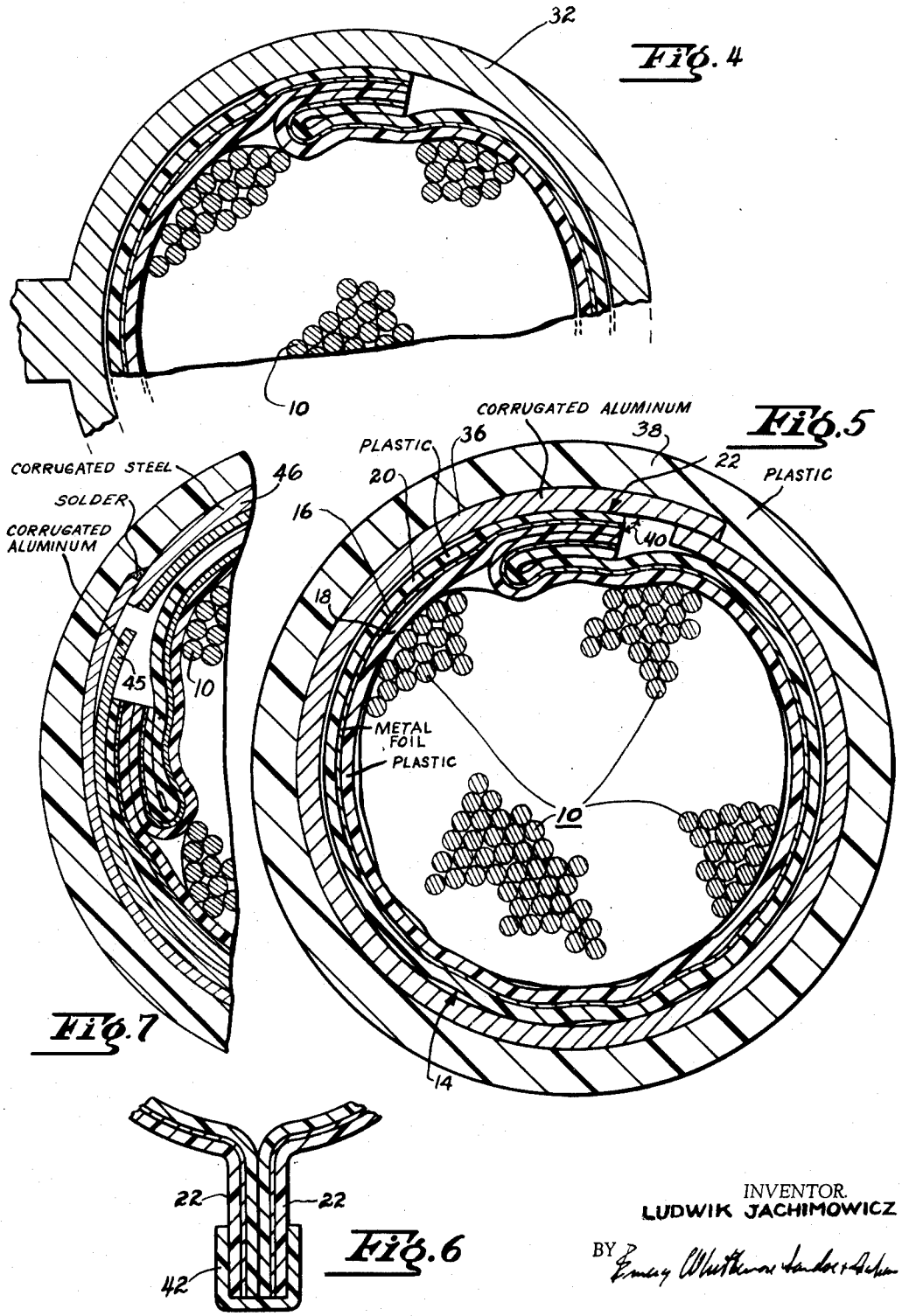

United States Patent Office 3,206,541
Patented Sept. 14, 1965

3,206,541
SHEATHED ELECTRICAL CABLE
Ludwik Jachimowicz, Elizabeth, N.J., assignor to General Cable Corporation, New York, N.Y., a corporation of New Jersey
Filed Apr. 29, 1963, Ser. No. 276,280
7 Claims. (Cl. 174—105)

This invention relates to an improved telephone cable construction using an inner jacket in a double sheathed cable and to the method of manufacturing such cable.

Telephone cable, to which this invention has most direct pertinence, and which has been selected as the illustration of the principles of the invention, comprises a plurality of individually insulated conductors assembled into a cable core. The conductors may be insulated with pulp or with the more recently introduced polyolefin insulations, such as polyethylene insulation.

The core may be wrapped with a core wrapper and is then provided with a sheath and outer jacket to protect the core components both electrically and mechanically.

For example, the art is familiar with the Alpeth construction in which a corrugated aluminum sheath is longitudinally folded over the cable core with overlapped edges. An outer jacket is then extruded over the aluminum.

Another type of conventional cable construction provides a longitudinally folded corrugated aluminum tape over the core, the edges of which do not overlap. A corrugated steel tape is then longitudinally wrapped over the aluminum tape with the edges overlapped. The overlapping edges are soldered together. A polyethylene jacket is then extruded over the sheath. This construction is known as Stalpeth.

The applications to which telephone cable is put require that the cable have extremely long life expectancy under adverse conditions. For example, such cable is often buried in the ground where it is subjected to water vapor permeation, water immersion, and lightning damage.

For example, the Alpeth construction has been found to allow moisture penetration through the plastic jacket since the metal sheath is not circumferentially complete. For this reason, the art has found it advisable to insulate the individual conductors with polyethylene and to restrict the usage of the cable.

The Stalpeth construction does provide an integral metal barrier when installed. However, when installed, jacket integrity is often destroyed by lightning strokes. Should the integrity of the outer polyethylene jacket be destroyed by such lightning strokes, and the metallic sheath by subsequent corrosion, water and water vapor will enter the cable core. With pulp insulated cable, cable inoperativeness is quite rapid. With the polyolefin insulated conductors, vapor alone will not damage the cable quickly. However, entry of water into the cable will eventually destroy the operating efficiency of the cable.

For these reasons, the art has resorted to providing an inner jacket extruded over the cable core. This inner jacket usually is an extruded polyolefin such as a high molecular weight polyethylene. The metallic cable sheath is then applied over the inner jacket and a jacket extruded thereover.

The inner jacket serves as a water barrier if the outer jacket and sheath is damaged. The cost of construction of such cable is more expensive than single jacket cable. However, it has been found desirable from an operating viewpoint to utilize this more expensive construction due to the very high costs of cable replacement and loss of revenue during replacement.

Although the inner jacket will serve as a water barrier, it does not serve as a barrier to water vapor penetration into the cable core. This, of course, is due to the fact that all known plastics are permeable to water vapor.

It is, therefore, the primary object of this invention to provide a cable construction incorporating an inner jacket of inexpensive construction which will, however, provide a low vapor permeability in a double sheath cable.

It is a further object of this invention to provide an improved method for the fabrication of double sheathed cable.

In accordance with this invention, there is provided a telephone cable construction having a cable core assembled in conventional fashion with a core wrapper thereover if desired.

An inner jacket is provided over the cable core. The inner jacket is an extremely thin, laminated construction having a metallic foil, for example, aluminum foil which may be of the order of .3 to 1 mil thick and outer polyolefin layers bonded to both sides thereof. Each polyolefin layer may be 5 mils thick and may comprise a polyethylene modified to bond directly to the foil under heat and pressure.

The sandwich inner jacket is folded longitudinally over the core. The sandwich is sufficiently wide so that it may be folded loosely over the core with the edges bent into radially extending tabs. The tabs are then sealed by heat and pressure, adhesive bonding, or ultrasonic impact into a radially extending flange or seam. This seam is folded over to overlap the cable core and to form a generally cylindrical configuration. Conventional sheath or sheaths may then be applied over the inner jacket and an outer jacket applied thereover. Such sheaths and jackets may be applied and constructed in accordance with conventional practice.

In accordance with the method of this invention, the telephone cable conductors are assembled in a core in conventional manner. The sandwich tape, consisting of a thin metallic foil to each side of which is bonded a thicker polyolefin sheet, is then loosely folded over the core with the edges deflected into radially extending tabs. The tabs are then welded together as, for example, by heating and passing the heated surfaces through pressure rollers, by ultrasonic welding and the like. The radially extending seam is then folded over and pressed into a generally circular configuration. A sheath may then be applied over the composite jacket and an outer jacket applied over the sheath in conventional manner.

Having briefly described this invention, it will be described in greater detail along with other objects and advantages thereof, in the following detailed description, which may best be understood by reference to the accompanying drawings, of which:

FIG. 1 is a plan view of a cable assembly line useful in illustrating the method of cable fabrication and cable construction in accordance with the present invention;

FIG. 2 is a sectional view taken along lines 2—2 of FIG. 1;

FIG. 3 is a sectional view taken along lines 3—3 of FIG. 1;

FIG. 4 is a sectional view taken along lines 4—4 of FIG. 1;

FIG. 5 is a cross sectional view taken along lines 5—5 of FIG. 1;

FIG. 6 is a sectional view according to another embodiment of this invention; and FIG. 7 is a fragmentary cross section corresponding to FIG. 5, showing a slightly different sheath construction.

In the figures, there is shown a cable core 10 consisting of a plurality of individually insulated cable conductors assembled into a core over which may be wrapped a core wrapper 12, such as a helically applied paper tape or a longitudinally folded and overlapped laminated tape of rubber and polyester.

An inner jacket is formed over the cable core by longitudinally folding a sandwich sheath 14 thereover. The sandwich is a laminated construction consisting of a thin metallic foil 16 to each side of which is securely bonded a polyolefin sheet 18, 20. For example, the metallic foil may consist of a thin aluminum foil, as for example, aluminum foil 0.0003 to 0.001 inch thick. The polyolefin layers bonded to the foil may comprise a polyethylene sheet 0.005–0.010 inch thick. The sandwich structure must be so formed that it will not delaminate under the influence of exposure to the ground water. The sheet may be formed by adhesively bonding the plastic sheets to the aluminum foil. The adhesive bond must be resistant to ground water and must not delaminate under exposure thereto. Alternatively, and preferably, the polyethylene may be directed bonded by heat and pressure to the foil. For example, film of the copolymers of polyethylene modified by monomers containing reactive carboxyl groups have the desired bonding characteristics. Such material as for example, the material sold by Dow Chemical under the designation QX–3623, may be bonded to the metallic foil by heating the foil and/or the plastic and passing the sandwich under pressure rollers. The modified polyethylene will bond to the metallic foil with a bond that is highly resistant to delamination under exposure to ground water. In the figures, the relative thickness of the various jackets and sheaths are exaggerated for clarity of explanation.

The sandwich is formed loosely about the core and the edges thereof are bent into radially extending tabs 22. The tabs are passed through a station 24 for heating thereof, as for example, by directing a blast of air heated to high temperatures, as for example 800 F., from a jet 26 directly upon the inside surface of the tabs 22. The temperature is enough to melt the plastic layer 18 inside the tabs 22 and as the tabs are passed between the pinch rollers 28, the tabs are pressed together and bonded together in a radially extending seam. The tabs are preferably at least 100 mils long to provide an elongated seam highly resistant to moisture penetration along the length thereof.

The radially extending seam is then folded over by passing the cable through a folding station 30 to press the tabs down into a generally cylindrical configuration as is best illustrated in FIG. 4, which shows the folding station ring 32.

The cable may then be completed by application of the requisite sheathing jacketing in the station 34. Sheathing and jacketing is not illustrated in detail since it is conventional and has been fully disclosed in the art as, for example, in U.S. Patent 2,589,700.

Thus, the cable consists of a core 10, optionally wrapped with wrapper 12, a folded loose-fitting inner jacket or sheath 14 (since the metal foil serves as a second sheath), a sheath which may be formed of folded corrugated aluminum tape 36, the edges of which are overlapped, or optionally a folded corrugated aluminum tape 45 with non-overlapping edges and an overlying folded corrugated steel tape 46, the edges of which are overlapped and soldered together, and an outer jacket 38, such as a polyethylene extrusion.

By this construction, several advantages are obtained over conventional extruded plastic inner packets. Since the composite inner jacket is extremely thin (0.010–0.012 in.) and relatively inexpensive, it can be applied in more economical fashion than the extruded inner jackets of polyethylene 45–75 mils thick. The thinness allows a double sheath construction without substantial increase in cable diameter. The inner jacket may, for example, be substituted for the conventional helical wrap of mylar/rubber tape over plastic insulated conductors since the inner sheet of plastic provides the required dielectric strength. Thus, often, no increase in cable diameter results. The metallic foil provides a positive water and water vapor barrier. Despite its thickness, the inner jacket will provide greater moisture protection than the conventional extruded plastic inner jacket.

For example, a typical prior art paper telephone double jacketed cable would have a core diameter of 2 inches (606 pairs, No. 22 AWG) with paper insulation in a 1000 ft. length weighing 140 kg., an inner jacket of extruded high molecular weight polyethylene 0.060-in. thick, and metallic sheaths thereover. If the outer jacket were punctured, sheath corroded and cable flooded, only one year will be required to raise the water content of the paper by 1% from its initial normal moisture content of 1% by weight, due to the permeation of vapor across the inner jacket. Thus, within one year, the insulation level of the cable will be impaired due to the doubling of water content.

In contrast, a cable constructed in accordance with the present invention would have the inner jacket formed of the foil sandwich. Otherwise, the construction and sheath damage assumed would be the same. With such construction, the inner jacket would provide a positive water and vapor barrier even when the cable is flooded. According to published data, unintentionable pin holes in aluminum foil 0.4 mils thick form an aggregate area of 0.00004 square inch per 100 square inches of foil. The vapor can thus penetrate through the pin holes (total area in 1000 ft. of 2 in. cable equalling 0.03 sq. inch) which, however, are covered by the inner and outer polyethylene sheets which total 10 mils in thickness. The area of the seam for a 1000 ft. length is 120 sq. inches covered by 100 mil effective thickness of polyethylene. For the same unit rate of permeation, it will take 1070 years to increase the moisture content of the paper by 1% from 1% initial. Thus, for all practical purposes, the inner jacket has a vapor resistance equivalent to that of a solid metallic pipe.

The outer layer of plastic sheet provides corrosion protection for the metal foil. The inner layer provides dielectric strength and insulation between the foil and the core.

It is usual to fabricate the inner jacket made of sandwich tape from wide sheets of material which are then slit to the desired width for economy of fabrication. In such construction, the edges of the foil are exposed.

It is, of course, possible to insulate the edges of the foil thereby to increase the corrosion protection by a folded tape as illustrated in FIG. 6 by heat sealing a strip of polyethylene tape 42 over the edge. However, in most applications, it is advantageous to allow the edges of the metallic foil to remain exposed for electric as well as cost considerations. The reasons are best understood by reference to FIG. 5 showing a cable constructed in accordance with the present invention. The inner jacket 14 is encased within an outer metallic shield which may be a composite shield formed of aluminum 36 (8 mils thick) and steel 37 (7 mils thick). Thus, the foil of the inner jacket 14 is electrically floating, being grounded only at splice cases. This double shield improves the shielding of the cable against external electrical noises.

FIG. 7 is a view similar to FIG. 5, but showing a modified sheath construction. The edges of the longitudinally folded corrugated aluminum tape 45 do not overlap. The edges of the longitudinally folded corrugated steel tape 46 are overlapped and soldered together. In other respects this cable is similar to that shown in FIG. 5.

However, when a lightning surge voltage is imposed on the outer shield, the voltage will jump across the gap defined by arrow 40 since the dielectric strength of the gap is far less than the dielectric strength of the outer plastic layer of the inner jacket 14. Thus, the outer plastic layer 20 will not be punctured, retaining its function of protecting the foil 16 from corrosion in the presence of water. The inner plastic sheet 18 provides ample dielectric strength between the core and the foil. Thus, though the inner and outer sheaths are electrically separated at noise voltage potentials, the short gap will provide a breakdown path for equalization of lightning surge voltages.

It has been found satisfactory merely to longitudinally fold the inner jacket over the cable core. By providing a loose fold of material, adequate flexibility of the cable without damage to the inner jacket can be ensured. Under usual conditions, telephone cables are restricted to bends of 20 times cable diameter. With such bend, the outside radius of the bend will be elongated 5%. The elongation of the outer portion of the inner jacket will be compensated to the level of 2–3% by the loose application, the balance being provided by stretching of the jacket. The plastic component has an elongation in excess of 100%. Aluminum foil will stretch without rupture from 3–5%. The inner jacket on the inside of the bend will take up shrinkage by wrinkling.

When bent around smaller diameters in unusual applications as, for example, in a bend of 10 times cable diameter, the outside radius of the bend will be elongated 10% which may exceed the possible stretching of the foil. However, in such applications, the aluminum foil merely develops minute cracks. The cracks act in the same way as additional pin holes in the foil and since the plastic remains uninterrupted, there is merely a slight increase in the vapor transfer rate. The total increase per 1000 ft. of cable of area is so slight in the usual case as to have little effect on the time computed above for cable outage due to increased humidity in the paper insulation.

This invention may be variously modified and embodied within the scope of the subjoined claims.

What is claimed is:

1. A double sheathed electric cable comprising a plurality of insulated conductors assembled into a cable core, an inner jacket, said inner jacket comprising a thin metallic foil sandwiched between and bonded with a delamination-resistant bond to two coextensive thicker polyolefin sheets, said sandwiched foil being folded longitudinally around said core loosely with the edges thereof bent outwardly in juxtaposition and bonded together along their contacting surfaces by the polyolefin in a seam, the inner polyolefin sheet insulating the metallic foil electrically from the cable core and the outer polyolefin sheet protecting the metallic foil against corrosion, said seam being loosely folded down against said inner jacket, and an outer sheath comprising a metallic layer over the inner jacket.

2. A cable in accordance with claim 1 in which said foil comprises aluminum foil from 0.0003 to 0.001 inch thick.

3. A cable in accordance with claim 1 in which said polyolefin sheets comprises a copolymer of polyethylene modified by monomers containing reactive carboxyl groups, said sheets being from 0.005 to 0.010 inch thick.

4. A cable in accordance with claim 1 which includes a core wrapper wrapped on said core.

5. A cable in accordance with claim 1 in which said outer sheath comprises a longitudinally folded aluminum tape.

6. A cable in accordance with claim 5 which includes a longitudinally folded steel tape over said aluminum tape.

7. A cable in accordance with claim 6 which includes an outer jacket extruded over said steel tape.

References Cited by the Examiner

UNITED STATES PATENTS 2,589,700   3/52   Johnstone _____ 174—109
3,073,889   1/63   Moore _____ 174—102

FOREIGN PATENTS 452,410   11/48   Canada.
875,378   5/53   Germany.

JOHN F. BURNS, *Primary Examiner.*

JOHN P. WILDMAN, *Examiner.*